(12) United States Patent
Meyer et al.

(10) Patent No.: US 7,303,624 B2
(45) Date of Patent: Dec. 4, 2007

(54) STRUCTURALLY COATED SILICA

(75) Inventors: Jürgen Meyer, Stockstadt (DE); Kurt Spitznagel, Hanau (DE); Hans-Dieter Christian, Alzenau (DE)

(73) Assignee: DeGussa AG, Hanau (DE)

( * ) Notice: Subject to any disclaimer, the term of this patent is extended or adjusted under 35 U.S.C. 154(b) by 0 days.

(21) Appl. No.: 10/732,238

(22) Filed: Dec. 11, 2003

(65) Prior Publication Data

US 2004/0127604 A1 Jul. 1, 2004

Related U.S. Application Data

(60) Provisional application No. 60/433,963, filed on Dec. 18, 2002.

(51) Int. Cl.
*C09C 1/30* (2006.01)
*C09D 7/00* (2006.01)

(52) U.S. Cl. ............. 106/491; 428/404; 428/407

(58) Field of Classification Search ............ 106/415, 106/475, 482, 491; 428/402–404, 407; 523/216
See application file for complete search history.

(56) References Cited

U.S. PATENT DOCUMENTS

| 2,870,108 | A | | 1/1959 | Nickerson |
| 3,037,933 | A | | 6/1962 | Wright |
| 4,150,101 | A | * | 4/1979 | Schmidt et al. ............ 423/338 |
| 4,477,607 | A | * | 10/1984 | Litke ........................ 523/212 |
| 5,021,317 | A | * | 6/1991 | Matsubara et al. ..... 430/108.21 |
| 5,034,207 | A | | 7/1991 | Kerner et al. |
| 5,221,337 | A | * | 6/1993 | Luers et al. ............... 106/266 |
| 5,429,873 | A | * | 7/1995 | Deusser et al. ........... 428/405 |
| 5,472,493 | A | * | 12/1995 | Regan ....................... 106/491 |
| 5,620,773 | A | | 4/1997 | Nash |
| 5,665,803 | A | | 9/1997 | Nohr et al. |
| 5,711,797 | A | | 1/1998 | Ehlinger, Jr. et al. |
| 5,959,005 | A | | 9/1999 | Hartmann et al. |
| 6,686,412 | B1 | * | 2/2004 | Berschel et al. ........... 524/507 |
| 2002/0055556 | A1 | * | 5/2002 | Schubert et al. .......... 523/216 |

FOREIGN PATENT DOCUMENTS

| GB | 1110331 A | 4/1968 |
| WO | WO 93/08236 A1 | 4/1993 |
| WO | WO 95/31508 A1 | 11/1995 |

* cited by examiner

*Primary Examiner*—C. Melisssa Koslow
(74) *Attorney, Agent, or Firm*—Venable, LLP; Thomas G. Wiseman

(57) ABSTRACT

A structurally coated silica can be prepared by spraying and mixing a pyrogenic silica with water and a coating agent in a suitable mixing vessel, then milling and then conditioning the product.

The structurally coated silica can be used as a matting agent in lacquers.

8 Claims, No Drawings

STRUCTURALLY COATED SILICA

This application claims the benefit of U.S. Provisional Application No. 60/433,963, filed Dec. 18, 2002.

The invention provides a structurally coated silica, a process for its preparation and its use.

An aerogel-like structured silica is disclosed in DE 24 14 478. This silica is prepared by incorporating and uniformly distributing water in an air-dispersed pyrogenic silica and drying the powdery mixture obtained.

This silica has the disadvantage that it has a strong tendency to settle out and is impossible or very difficult to redisperse.

The document DE 15 92 863 describes organically modified precipitation silicas which are coated, for example, with a wax and may be used as matting agents.

These known silicas exhibit poor transparency in a variety of lacquer systems. Due to the high moisture content, these silicas cannot be used in moisture-curing polyurethane systems. Lacquer systems which are difficult to provide with a matt finish, such as polyurethane and epoxy lacquer systems, cannot be matted in a satisfactory manner using known silicas.

Thus, there is the object of preparing a silica which does not have these disadvantages.

The invention provides a structurally coated silica. It may have a carbon content of 1 to 30 wt. %.

The silica according to the invention may have a BET surface area of 80 to 450 $m^2/g$. It may have a compacted bulk density of 10 to 100 g/l. The DBP index may be 200 to 150.

A 4% strength aqueous suspension of the silica according to the invention may have a pH of 6 to 8.

The expression structurally coated means that the end product is more highly structured than the starting product and is also coated. The structurally coated silica has a higher DBP index than the initial silica.

The structurally coated silica according to the invention may be prepared by spraying and mixing a pyrogenic silica with water and a coating agent in a suitable mixing vessel, then milling and subsequently drying.

Any known pyrogenic silica may be used as the pyrogenic silica.

In a preferred embodiment of the invention, pyrogenic silicas in accordance with Table 1 may be used.

Pyrogenic silicas are disclosed in Ullmann's Encyklopädie der technischen Chemie, 4th edition, vol. 21, pages 464 et seq. (1982).

They are prepared by flame hydrolysis, when a vaporizable metal or metalloid compound, such as for example silicon tetrachloride, is burnt with hydrogen- and oxygen-containing gases in a flame.

TABLE 1

Physico-chemical data for AEROSILS

| Test method | | AEROSIL 90 | AEROSIL 130 | AEROSIL 150 | AEROSIL 200 | AEROSIL 300 | AEROSIL 380 | AEROSIL OX 50 | AEROSIL TT 600 |
|---|---|---|---|---|---|---|---|---|---|
| Behaviour in presence of water | | hydrophilic | | | | | | | |
| Appearance | | fluffy white powder | | | | | | | |
| BET surface area[1)] | $m^2/g$ | 90 ± 15 | 130 ± 25 | 150 ± 15 | 200 ± 25 | 300 ± 30 | 380 ± 30 | 50 ± 15 | 200 ± 50 |
| Average size of primary particles | nm | 20 | 16 | 14 | 12 | 7 | 7 | 40 | 40 |
| Bulk density approx. value[2)] | g/l | 80 | 50 | 50 | 50 | 50 | 50 | 130 | 60 |
| compacted goods (additive "V") | g/l | 120 | 120 | 120 50/75 | 120 50/75 120 | 120 50/75 120 | 120 | | |
| VV goods (additive "VV")[12)] | g/l | | | | | | | | |
| Loss on drying[3)] (2 hours at 105° C.) on dispatch from delivery factory | % | <1.0 | <1.5 | <0.5[9)] | <1.5 | <1.5 | <2.0 | <1.5 | <2.5 |
| Loss on ignition[4) 7)] (2 hours at 1000° C.) | % | <1 | <1 | <1 | <1 | <2 | <2.5 | <1 | <2.5 |
| pH[5)] | | 3.7-4.7 | 3.7-4.7 | 3.7-4.7 | 3.7-4.7 | 3.7-4.7 | 3.7-4.7 | 3.8-4.8 | 3.6-4.5 |
| $SiO_2$[8)] | % | >99.8 | >99.8 | >99.8 | >99.8 | >99.8 | >99.8 | >99.8 | >99.8 |
| $Al_2O_3$[8)] | % | <0.05 | <0.05 | <0.05 | <0.05 | <0.05 | <0.05 | <0.08 | <0.05 |
| $Fe_2O_3$[8)] | % | <0.003 | <0.003 | <0.003 | <0.003 | <0.003 | <0.003 | <0.01 | <0.003 |
| $TiO_2$[8)] | % | <0.03 | <0.03 | <0.03 | <0.03 | <0.03 | <0.03 | <0.03 | <0.03 |
| HCl[8) 10)] | % | <0.025 | <0.025 | <0.025 | <0.025 | <0.025 | <0.025 | <0.025 | <0.025 |
| Screening residue[8)] (Mocker, 45 μm) | % | <0.05 | <0.05 | <0.05 | <0.05 | <0.05 | <0.05 | <0.2 | <0.05 |

TABLE 1-continued

Physico-chemical data for AEROSILS

| Test method | | AEROSIL 90 | AEROSIL 130 | AEROSIL 150 | AEROSIL 200 | AEROSIL 300 | AEROSIL 380 | AEROSIL OX 50 | AEROSIL TT 600 |
|---|---|---|---|---|---|---|---|---|---|
| Drum size (nett)[11] | kg | 10 | 10 | 10 | 10 | 10 | 10 | 10 | 10 |

[1] based on DIN 66131
[2] based on DIN ISO 787/XI, JIS K 5101/18 (not screened)
[3] based on DIN ISO 787/II, ASTM D 280, JIS K 5101/21
[4] based on DIN 55921, ASTM D 1208, JIS K 5101/23
[5] based on DIN ISO 787/IX, ASTM D 1208, JIS K 5101/24
[6] based on DIN ISO 787/XVIII, JIS K 5101/20
[7] with respect to substance dried for 2 hours at 105° C.
[8] with respect to substance heated for 2 hours at 1000° C.
[9] specifically for moisture resistant packaging
[10] HCl content is a constituent of the loss on ignition
[11] V goods are supplied in 20 kg sacks
[12] VV goods are currently supplied exclusively by the Rheinfelden factory From among the pyrogenic silicas listed in Table 1, non-compacted variants of preferably all the types of Aerosil, with the exception of AEROSIL OX50, may also be used.

Waxes and/or organically modified polysiloxanes in the form of aqueous dispersions or emulsions may be used as coating agents. Aqueous dispersions or emulsions of waxes for use according to the invention may contain the following waxes:

Polyethylene homopolymer and copolymer waxes; number average molecular weight 700-10,000 g/mol, with a dropping point of 80-140° C.

PTFE waxes; polytetrafluoroethylene with a molecular weight between 30,000 and 2,000,000 g/mol, in particular between 100,000 and 1,000,000 g/mol.

Polypropylene homopolymer and copolymer waxes; number average molecular weight 700-10,000 g/mol, with a dropping point of 80-160° C.

Amide waxes; prepared by reacting ammonia or ethylenediamine with saturated and unsaturated fatty acids. The fatty acids are, for example, stearic acid, tallow fatty acid, palmitic acid or erucic acid.

FT paraffins; number average molecular weight 400-800 g/mol, with a dropping point of 80-125° C.

Montan waxes including acid and ester waxes with a carboxylic acid carbon-chain length of $C_{22}$-$C_{36}$. The ester waxes are reaction products of Montan wax with one or more polyhydric alcohols such as, for example, ethanediol, butane-1,3-diol or propane-1,2,3-triol.

Natural waxes such as, for example, carnauba wax or candelilla wax.

Macro- or microcrystalline paraffins which are produced during the refining of petroleum. The dropping point of the paraffins is between 45 and 65° C., that of the microcrystalline waxes is between 73 and 100° C.

Sorbitan esters of Montan alcohols.

Furthermore, the following may be used:

A homopolymer or copolymer of $C_2$-$C_{18}$-$\alpha$-olefins prepared using Ziegler metal catalysis and one or more other waxes as auxiliary agents, chosen from the group:
PE waxes,
PTFE waxes,
PP waxes,
amide waxes,
FT paraffins,
Montan waxes,
natural waxes,
macro- and microcrystalline paraffins,
polar polyolefin waxes or
sorbitan esters The homopolymers or copolymers of $C_2$-$C_{18}$-$\alpha$-olefins prepared using Ziegler metallocene catalysis preferably have the following properties:
Dropping point (Dp): 80-165° C. 90-155° C.
Acid value (AV): 0-50 mg KOH/g
Density: 0.87-1.03 g/cm$^3$
Viscosity of melt at 170° C.: 10-100,000 mPas Suitable polyolefin waxes are homopolymers of ethylene or propylene or copolymers of. ethylene and propylene with each other or with one or more 1-olefins.

Polysiloxanes for use according to the invention may be:
An oil-in-water emulsion of
organically modified polysiloxanes (organic modification: $C_2$ to $C_8$ alcohols and EO/PO polyethers)
approximate average Mw: 1000 to 5000 g/mol
(filled with hydrophobic silica) active substance content of emulsion: about 20%

Since the volume of the silica decreases only very slightly when incorporating water and the coating agent, it is assumed that the association of primary particles originally present in air-dispersed pyrogenic silica is substantially retained. As a result of loading with water and coating agent, partial dissolution of the surface of the silica probably takes place so that dissolved silica is present here. This binds the primary particles together at any contact points during the subsequent drying process.

Thus a dispersion-stable substance with high macrovolumes and very low apparent density (bulk density), corresponding to a Kistler Aerogel, is produced from a pyrogenic silica by targeted loading with water and coating agent followed by drying.

Furthermore, it has been found that the structure which is apparently present prior to incorporating water and the coating agent, determined by the packing density of the pyrogenic silica in air and which is expressed by its apparent density (bulk density), has an obvious effect on the product produced by the process according to the invention: The more voluminous the starting product, the more voluminous the end product obtained.

It has proven expedient to use pyrogenic silicas with a compacted bulk density of 10 to 130, preferably 15 to 80, in particular about 20 g/l, to prepare products according to the invention.

In addition, it has proven advantageous to choose pyrogenic silicas with large surface areas and thus small primary particles. According to a beneficial embodiment of the process according to the invention, silicas with BET surface areas between 100 and 480, in particular 250 to 410 m²/g are used.

Complete wetting of the primary particles can be achieved when 5 to 20, in particular 7 to 15 wt. % of water and coating agent are incorporated and uniformly distributed in the silica. Since the water which has been incorporated is to be dried out again, the smallest possible amount of water is aimed at, for economic reasons. However, the amount required depends to some extent on the type of incorporation procedure used.

The build up of a structure in accordance with the invention can be greatly encouraged when basic compounds such as, for example, ammonia, sodium or potassium hydroxide, water-soluble amines, waterglass, etc. are added to the water and coating agent. The amounts added are expediently chosen so that the pH in the water is adjusted to a value of 7 to 14, preferably 8 to 12, in particular 10 to 11.

The alkalis used act as solution promoters for silica and bring about an increase in the macroporosity of the process products.

Instead of alkaline compounds, free silica or hydrolytic silica and/or alkali-releasing substances can also be added to the water and coating agent.

In fact free silica, produced for example by the acidification or ion exchange of silicate solutions or by hydrolytic decomposition of silicon-organic compounds, for example of tetramethyl silicate, also promotes the build up of a structure. A hydrolytic alkali and silica releasing substance is, for example, sodium methylsiliconate.

Uniform distribution of the water and coating agent in the silica can take place by dripping or spraying these into/onto the silica which is being mixed by agitation with the silica at temperatures between 20 and 100, preferably 40 to 70, in particular 50 to 60° C. Mixing by agitation is expediently performed by stirring.

Another variant for introducing the water comprises spraying the silica with water and coating agent in a fluidized stream of material, for example using a downpipe.

It has also proven advantageous to perform the water loading process at a moderately elevated temperature. This can be achieved by preheating either the water to be incorporated with the coating agent or the silica or both components. Thus, the water to be incorporated with the coating agent can have a temperature between 20 and 100, preferably 50 to 100, in particular 90 to 100° C.

The build up of structure can also be promoted by short-term steaming of the loaded silica in a sealed space. Steaming leads to especially good distribution of the water. It has proven advantageous here to steam the water-laden silica, before drying, in a sealed vessel for about 5 to 60, preferably 10 to 30, in particular about 20 minutes, at temperatures up to the boiling point of water, preferably 50 to 80, in particular about 60° C.

Another possibility for improving the distribution of water and coating agent comprises milling the silica laden with water and coating agent, for example in pin mills or air-jet mills.

The silica is then dried, wherein the preformed structure is probably fixed via the primary particles whose surface is covered with dissolved silica or coated with free silica.

The type of drying is less critical.

The prepared mixture of silica and coating agent, which always appears to have the status of a dry powder, can be dried, for example, in tray, disc, Büttner, continuous flow or microwave driers. The silica laden with water and coating agent can, however, also be simultaneously milled and dried in a steam or air-jet mill in order to save a separate process step.

If a separate drying procedure is performed with the powdered mixture obtained after loading with water and coating agent, this may be followed by dry milling in a pin mill or air-jet mill.

The silica according to the invention can be used as a matting agent in lacquers. It then has the following advantages:

no settling out, or easy to redisperse,
no impairment to the matting efficiency,
improvement to the feel,
enables more highly transparent clear lacquers,
low moisture content, therefore can be used in moisture-curing PU systems (polyurethane systems),
better rheology, because it is less thixotropic.

The silica according to the invention can be used in particular in polyurethane lacquers.

EXAMPLES

Preparing the Structurally Coated Silica According to the Invention

Hydrophilic pyrogenic silica (Aerosil 300) with the following physico-chemical properties is used:

| | |
|---|---|
| Specific BET surface area [m²/g]: | 290.0 |
| pH: | 4.2 |
| Compacted density [g/l]: | 35 |
| Loss on drying [%]: | 0.8 |
| DBP index [%]: | 305.0 |
| Carbon content [%]: | 0 |

A plough bar mixer is used as the mixing vessel. The coating agent is sprayed in at room temperature using a two-fluid nozzle.

The following products are used as coating agents:

Coating Agent A:

Coating agent A is known from EP 0 341 383 A2. it is a wax emulsion and is prepared as follows:

The wax emulsion is prepared in an autoclave which can be heated with steam and is provided with a disperser. In this, 4.8 parts by wt. of an alkyl polyglycol ether (Marlowet® GFW) at 100° C. are first dissolved in 81.0 parts by wt. of water at about 100° C. Then 14.2 parts by wt. of low-pressure polyethylene wax are added and the mixture is heated to 130° C. On reaching 130° C., the disperser is switched on and the mixture is dispersed for 30 minutes. The temperature is held at between 130 and 140° C. for this period. After switching off the disperser and cooling to about 110° C., the final emulsion is discharged.

The polyethylene wax is characterized by the following physical characteristics:

| | |
|---|---|
| average molecular weight | 1000 |
| solidification point | 100-104° C. |
| dropping point | 110-117° C. |
| density (g/cm³) | 0.93 |

The emulsion is then adjusted to the required pH.

Coating Agent B

Coating agent B is known from EP 0 341 383 A2. It is a wax emulsion and is prepared as follows:

The wax emulsion is prepared in an autoclave which can be heated with steam and which is provided with a disperser. In this, 4.8 parts by wt. of an alkyl polyglycol ether (Marlowet® GFW) at 100° C. are first dissolved in 81.0 parts by wt. of water at about 100° C.

Then 14.2 parts by wt. of a low-pressure polyethylene wax are added and the mixture is heated to 130° C. On reaching 130° C., the disperser is switched on and the mixture is dispersed for 30 minutes. The temperature is held at between 130 and 140° C. during this period. After switching off the disperser and cooling to about 110° C., the final emulsion is discharged.

The polyethylene wax used is characterized by the following characteristics:

| average molecular weight | 2700 |
| Solidification point | 92-96° C. |
| dropping point | 102-110° C. |
| density (g/cm$^3$) | 0.92 |

The emulsion is then adjusted to the required pH.

Coating Agent C

Coating agent C consists of 656.4 g of an aqueous polysiloxane emulsion which is diluted with 210 g of water and adjusted to the required pH.

The polysiloxane emulsion has the following physico-chemical properties:

| Form: | viscous |
| Color: | white |
| Odor: | slight characteristic odor |
| Boiling point: | about 100° C. |
| Density: | about 1 g/cm$^3$ |
| | at 20° C. |
| Solubility in water: | miscible |
| pH: | 5.5 |
| | at 20° C. |
| | in original state |
| viscosity, dynamic: | about 2,300 mPa.s |
| | at 25° C. |

Coating Agent D

Coating agent D consists of 503.0 g of an aqueous alkyl ester/polydimethylsiloxane emulsion which is diluted with 116 g of water and adjusted to the required pH.

The alkyl ester/polydimethylsiloxane emulsion has the following physico-chemical properties:

| Form: | viscous |
| Color: | white |
| Odor: | slight characteristic odor |
| Boiling point: | about 100° C. |
| Density: | about 0.95 g/cm$^3$ |
| | at 25° C. |

| Solubility in water: | miscible |
| pH: | 5.8 |
| | at 25° C. |
| | in original state |
| Viscosity, kinematic: | about 40-120 mm$^2$/s |
| | at 20° C. |
| | Method: 4 DIN 53211 |

Coating Agent E

Coating agent E consists of 365.6 g of an aqueous emulsion of an ester wax and canauba wax and 346 g of water. The mixture is adjusted to a pH of 10.6.

The emulsion of ester wax, carnauba wax, emulsifier and water has the following composition:

| Components: | %-age range | CAS-No. |
|---|---|---|
| Carnauba wax | 15-25% | 8015-86-9 |
| Ester wax | 15-25% | 73138-45-1 |
| Emulsifier | 5-10% | 68920-66-1 |
| Water | 40-50% | 7732-18-5 |

The emulsion used has the following physico-chemical properties:

| Appearance: | liquid |
| Color: | pale yellow to light brown |
| Odor: | mild |
| Boiling point: | 100° C., starts to boil |
| Melting point: | 0° C., like water (solid about 86° C.) |
| Relative density (water = 1): | 1.01-1.02 g/ml at 20° C. |
| Vapor pressure: | 23 mbar (at 20° C.), same as water |
| pH: | 5.0-5.6 |
| Solubility in water: | miscible in all ratios |

Comparison Example

For comparison, only water (adjusted to be alkaline) instead of coating agent was used in example 8.

TABLE 2

Preparing the moistened material

| Number | Amount of silica [kg] | Coating agent | Amount of coating agent [kg] | pH of coating agent | pH adjusted by adding | Loss on drying of moistened material |
|---|---|---|---|---|---|---|
| 1 | 2 | A | 0.938 | 10.5 | NaOH | 27.6 |
| 2 | 2 | B | 0.995 | 10.5 | $NH_4OH$ | 27.4 |
| 3 | 2 | C | 0.865 | 11.3 | $NH_4OH$ | 24.4 |
| 4 | 2 | C | 1.110 | 11.2 | waterglass | 27.4 |
| 5 | 2 | D | 0.634 | 9.8 | waterglass | 14.3 |
| 6 | 2 | D | 1.593 | 10.8 | NaOH | 21.4 |
| 7 | 2 | E | 0.711 | 10.6 | $NH_4OH$ | 14.6 |
| 8 | 2 | none comparison example | 0.765 | 11.5 | $NH_4OH$ | 27.8 |

TABLE 3

Milling and drying the moistened material

| Number | Milling unit | Throughput during milling [kg/h] | Drying temperature [° C.] | Drying time [h] |
|---|---|---|---|---|
| 1 | pin mill | 5 | 120 | 15 |
| 2 | gas-jet mill | 7 | 120 | 15 |
| 3 | gas-jet mill | 7 | 120 | 13 |
| 4 | gas-jet mill | 7 | 120 | 12 |
| 5 | pin mill | 5 | 120 | 12 |
| 6 | pin mill | 5 | 120 | 15 |
| 7 | pin mill | 5 | 120 | 10 |
| 8 | gas-jet mill | 7 | 120 | 11 |

TABLE 4

Physico-chemical data

| Number | LOD [%] | LOI [%] | pH | DBP [%] | CBD [g/l] | C [%] | Coating agent used |
|---|---|---|---|---|---|---|---|
| 1 | 0.8 | 7.8 | 6.4 | 338 | 26 | 4.1 | A |
| 2 | 2.5 | 7.4 | 6.3 | 321 | 29 | 4.3 | B |
| 3 | 1.6 | 4.9 | 6.5 | 326 | 24 | 3.0 | C |
| 4 | 1.6 | 6.1 | 6.9 | 301 | 25 | 4.4 | C |
| 5 | 0.8 | 9.4 | 6.3 | 331 | 23 | 6.5 | D |
| 6 | 2.0 | 19.4 | 7.2 | n.d. | 46 | 16.0 | D |
| 7 | 2.7 | 8.6 | 7.4 | 313 | 26 | 5.0 | E |
| 8 | 2.3 | 1.6 | 6.9 | 326 | 22 | 0 | none comparison example |

Determining the Physico-chemical Characteristics

BET Surface Area

The BET surface area is determined in accordance with DIN 66 131 using nitrogen.

Compacted Density

The compacted density is determined using a method based on DIN ISO 787/XI

Basis for Determining Compacted Density

The compacted density (previously compacted volume) is given by the quotient of the weight and the volume of the powder after compacting in a compacting volumeter under fixed conditions. According to DIN ISO 787/XI the compacted density is given in g/cm³. Due to the very low compacted density of the oxides, however, we give the values in g/l. Furthermore, we do not perform drying and screening procedures nor do we repeat the compacting process.

Equipment for Determining the Compacted Density

Compacting volumeter

Measuring cylinder

Laboratory scales (readability 0.01 g)

Method for Determining the Compacted Density 200±10 ml of oxide are placed in the measuring cylinder of the compacting volumeter in such a way that there are no cavities and the surface is horizontal.

The weight of the sample in the measuring cylinder is determined accurately to 0.01 g. The measuring cylinder with the sample is inserted into the measuring cylinder holder in the compacting volumeter and rammed down 1250 times.

The volume of the compacted oxide is read off accurately to 1 ml.

Evaluating the Compacted Density Determination $$\text{Compacted density (g/l)} = \frac{\text{g amount weighed out} \times 1000}{\text{ml volume read off}}$$

pH

The pH is determined in 4% strength aqueous solution; in the case of hydrophobic oxides in water:methanol 1:1.

Reagents for Determining pH
distilled or deionized water, pH >5.5
Methanol, AR
Buffer solutions pH 7.00 pH 4.66

Equipment for Determining pH
Laboratory scales, (readability 0.1 g)
Beaker, 250 ml
Magnetic stirrer
Magnetic rod, length 4 cm
Combined pH electrode
pH instrument
Dispensette, 100 ml Instructions for Determining pH The method for determining pH is based on DIN/ISO 787/IX: Calibration: Before measuring the pH, the instrument is calibrated with buffer solutions. If several measurements are performed in sequence, a single calibration procedure is sufficient.

4 g of hydrophilic oxide are stirred with the aid of a dispensette in a 250 ml beaker with 96 g (96 ml) of water and then for five minutes with a magnetic stirrer (speed ca. 1000 min$^{-1}$) with the pH electrode immersed therein.

4 g of hydrophobic oxide are stirred up with 48 g (61 ml) of methanol in a 250 ml beaker and the suspension is diluted with 48 g (48 ml) of water and stirred with a magnetic stirrer (speed ca. 1000 min$^{-1}$) for five minutes with the pH electrode immersed therein.

After switching off the stirrer, the pH is read off after a waiting time of one minute. The result is recorded to one decimal place.

Loss on Drying

Differently from the amount of 10 g initially weighed out, as mentioned in DIN ISO 787 II, a 1 g amount is used for determining the loss on drying.

The lid is put on before cooling. A second drying is not performed.

About 1 g of the sample is weighed accurately to 0.1 mg into a weighing dish with a ground-glass lid and which has been dried at 105° C., avoiding the production of dust, and dried at 105° C. for two hours in a drying cabinet. After cooling with the lid in place, in a desiccator over blue silica gel, the dish is reweighed.

$$\% \text{ loss on drying at } 105° \text{ C.} = \frac{\text{g loss in weight}}{\text{g initial wt. of sample}} \times 100$$

The result is recorded to one decimal place.

Loss on Ignition

Equipment for Determining Loss on Ignition
Porcelain crucible with crucible lid
Muffle furnace
Analytical scales (readability 0.1 mg)
Desiccator Method Used to Determine Loss on Ignition Differently from DIN 55 921, 0.3-1 g of the substance which has not been predried is weighed accurately to 0.1 mg into a previously strongly heated porcelain crucible with a crucible lid and heated for 2 hours at 1000° C. in a muffle furnace.

Efforts must be made to avoid the production of dust. It has proven beneficial to place the weighed out sample in a muffle furnace which is still cold.

Due to slow heating up of the furnace, vigorous air turbulence in the porcelain crucible is avoided.

After reaching 1000° C., heating is continued for another 2 hours. Then the crucible is covered with a lid, the crucible is placed in a desiccator over blue silica gel and the loss in weight is determined.

Evaluating the Loss on Ignition Determination

Since the loss on ignition is given with reference to the sample dried for 2 hours at 105° C., the following formula is used for the calculation:

$$\% \text{ loss on ignition} = \frac{m_0 \times \frac{100 - LOD}{100} - m_1}{m_0 \times \frac{100 - LOD}{100}} \times 100$$

$m_0$=amount initially weighed out (g)
LOD=loss on drying (%)
$m_1$=weight of strongly heated sample (g)

The result is recorded to one decimal place.

DBP Index

Equipment for Determining DBP Index
To-pan scales
Plastic beaker (250 ml)
Brabender plastograph with metering unit Reagent
Dibutyl phthalate (techn.)

Method
1. Check the cut-off point
   Switch on the plastograph without the metering pump.
   Open the protective valve for the operating section (under Display)
   Press the "Func" button; the display should alternate between the cut-off value "1000" and the alarm "AI H.A.";
   after 5 sec. the display again appears in Normal mode.
2. Calibration
   Switch on the plastograph without the metering pump.
   Switch on the compounder (press both Start buttons simultaneously).
   Press the "Cal" button once, then press the "Funk" button; the display should alternate between the current zero point and "Lo S.C.".
   Press the "Cal" button again; after four seconds (calibration), the instrument displays the current total range "10000" and "Fu S.C.".
   Press the "Cal" once more; after four seconds (calibration), the instrument should display the friction-corrected zero point "tare".
   Press the "Cal" button once more and wait 5 sec.
   If required, perform the "cut-off point" and "calibration" procedures once daily before taking measurements!
3. Measurement
   12.5 g of sample are weighed into a plastic beaker and placed in the compounding chamber. If instructed, the amount weighed out may differ from this (e.g. 8 or 20 g). The DBP metering unit is switched on. As soon as the filling procedure is complete (display F), the plastograph is ready for use.
   Measurement starts when the Start buttons are pressed simultaneously.
   The metering unit meters 4 ml DBP/min until the pre-set cut-off point (1000) is reached.

The instrument switches off automatically.
Only the consumption of DBP can be read on the display for the metering unit.

Calculation $$DBP\ (\%) = \frac{\text{Dosimat display} \times 1.047 \times 100}{\text{Amount weighed out (g)}}$$

The result is always given with the amount weighed out.

The Use of Silicas According to the Invention in Lacquers.

Silicas according to the invention in accordance with examples 1 to 7 are tested in various lacquer systems. The results of these tests are given in Tables 5 to 8.

Table 5 shows the effect of silicas according to the invention in accordance with examples 1 to 7 which are used in black stoving lacquer DUPLEX D 1326 and this is compared with the matting agent in accordance with DE 24 14 478.

The stoving lacquer DUPLEX 1326 is a commercial product from DuPont Coatings, Austria. The basis of the binder is an alkyd/melamine resin. Characteristics: black pigmented alkyl/melamine resin stoving lacquer, high-gloss, original use: motor vehicle (HGV) mass production lacquer. It is used as a standard test system, in particular for testing the grindometer value and the matting efficiency.

It is used as a model for pigmented industrial lacquers with average mattability. An identical gloss level (60° reflectometer value) was set for all the products by varying the amount weighed out.

The Results are as Follows:

It is obvious from the values in the Table that, despite the presence of a coating and lower grindometer values (particle size), no impairment to the high matting effect is demonstrated.

Table 6 shows the effect of silicas according to the invention in accordance with examples 1 to 7 which are used in a NC test lacquer for suspended particle tests and this is compared with the matting agent in accordance with DE 24 14 478. The NC test lacquer is used exclusively for testing the settling out behavior of matting agents. It has the following composition.

| Raw material | Concentration | Amount |
|---|---|---|
| Toluene | | 15.00 |
| Butanol | | 10.00 |
| Ethyl acetate | | 10.00 |
| Butyl acetate 85 | | 10.00 |
| NC-Chips E 510 82/18 DBP | | 12.00 |
| Dibutyl phthalate | | 1.00 |
| Castor oil 18 P aerated | | 2.00 |
| Jägalyd E 42 | 60.00% in xylene | 10.00 |

| Raw material | Concentration | Amount |
|---|---|---|
| Alresat KM 31 1:1 | 50.00% in ethyl acetate/butyl acetate 85% | 20.00 |
| Petrol 100/140 | | 10.00 |
| Total | | 100.00 |

The Results are as Follows:

Almost all the coated samples have greatly improved suspended particle behavior. Sometimes, no settling out at all is observed (examples 3 and 4).

Table 7 shows the effect of silicas according to the invention in accordance with examples 1 to 7 which are used in DD blue-streak lacquer P and this is compared with the matting agent in accordance with DE 24 14 478. The blue-streak lacquer is a 2-component polyurethane lacquer and is used in particular to test matting efficiency. It is used as a model for unpigmented wood and furniture lacquers which are difficult to provide with a matt finish. The direct effect of the matting agent on the degree of gloss (reflectometer value) is obtained by always weighing out the same amount of all the products.

The blue-streak lacquer has the following composition:

| Raw material | Concentration | Amount |
|---|---|---|
| Butyl acetate 98% | | 8.30 |
| Ethoxypropyl acetate | | 16.50 |
| Desmophen 800 | | 115.00 |
| Desmophen 1100 | | 20.00 |
| CAB 381-0.5 | 10.00% in butyl acetate 98% | 3.00 |
| Mowilith 20 | 50.00% in ethyl acetate | 3.00 |
| Baysilone OL | 10.00 in xylene | 0.10 |
| BYK 361 | | 0.30 |
| Xylene | | 33.80 |
| Total | | 100.00 |

The Results are as Follows:

All the samples have a low thixotropy and only a small or zero rheological effect on the lacquer system. This has an advantageous effect on the lacquer processing properties.

Table 8 shows the effect of silicas according to the invention in accordance with examples 1 to 7 in the standardized wax detachment test. This test is used to check whether all the coating agent applied to prevent settling out remains on the silica in the lacquer and cannot be removed. For this purpose, the coated silicas are subjected to storage in ethoxypropyl acetate at elevated temperature. If a product passes this test, it can be predicted with high probability that the result will apply in all lacquer systems.

The results show that detachment of the coating agent cannot be detected with any of these silicas.

TABLE 5

| Dispersion: 10 min blade agitator, Ø 45 mm 2000 rpm PE beaker 350 ml | A | B | C | D | E | F | G | H | I | J |
|---|---|---|---|---|---|---|---|---|---|---|
| Stoving lacquer black DUBLEX D 1326 g | 100 | 100 | 100 | 100 | 100 | 100 | 100 | 100 | 100 | 100 |
| Dilution V 0003 g | 20 | 20 | 20 | 20 | 20 | 20 | 20 | 20 | 20 | 20 |

TABLE 5-continued

| Dispersion: 10 min blade agitator, Ø 45 mm 2000 rpm PE beaker 350 ml | A | B | C | D | E | F | G | H | I | J |
|---|---|---|---|---|---|---|---|---|---|---|
| ACEMATT TS 100 g | 2.4 | | | | | | | | | |
| Example 1 g | | 2.6 | | | | | | | | |
| Example 2 g | | | 2.6 | | | | | | | |
| Example 3 g | | | | 2.7 | | | | | | |
| Example 4 g | | | | | 2.9 | | | | | |
| Example 5 g | | | | | | 2.7 | | | | |
| Example 6 g | | | | | | | 3.4 | | | |
| Example 7 g | | | | | | | | 2.4 | | |
| ACEMATT OK 500 g | | | | | | | | | 3.8 | |
| ACEMATT OK 520 g | | | | | | | | | | 4.1 |
| Discharge time DIN beaker 4 mm s | 30 | 32 | 30 | 33 | 34 | 34 | 30 | | 26 | 31 |
| Grindometer value µm | 42 | 40 | 40 | 39 | 38 | 40 | 40 | | 26 | 28 |
| Specks up to µm | not clean | — | — | — | — | — | — | — | — | — |
| Application using film applicator Erichsen 509 MC on glass discs, rate of application 25 mm/s, slot spreader 120 µm, drying time: 10-20 min, stoving conditions: 20 min 150° C. | | | | | | | | | | |
| Air temperature while drying ° C. | 23 | 23 | 23 | 23 | 23 | 23 | 23 | 23 | 23 | 23 |
| Relative humidity while drying % | 70 | 70 | 70 | 70 | 70 | 70 | 70 | 70 | 70 | 70 |
| Thickness of layer µm | 24 | 24 | 24 | 24 | 24 | 24 | 24 | 24 | 24 | 24 |
| 60°-Reflectometer value | 36.6 | 35.4 | 37.4 | 37.5 | 35.2 | 37.2 | 36.7 | 37.9 | 35.5 | 35.7 |
| 85°-Reflectometer value | 71.7 | 71.8 | 74.1 | 71.6 | 69.1 | 69.4 | 72.0 | 72.1 | 83.6 | 83.6 |
| Δ85°-60° Reflectometer value | 35.1 | 36.4 | 36.7 | 34.1 | 33.9 | 32.2 | 35.3 | 34.2 | 48.1 | 47.9 |

TABLE 6

| Dispersion: 10 min blade agitator, Ø 45 mm 2000 U/min PE beaker 350 ml | A | B | C | D | E | F | G | H |
|---|---|---|---|---|---|---|---|---|
| NC test lacquer for suspended particles test g | 40.0 | 40.0 | 40.0 | 40.0 | 40.0 | 40.0 | 40.0 | 40.0 |
| ACEMATT TS 100 g | 0.4 | | | | | | | |
| Example 1 g | | 0.4 | | | | | | |
| Example 2 g | | | 0.4 | | | | | |
| Example 3 g | | | | 0.4 | | | | |
| Example 4 g | | | | | 0.4 | | | |
| Example 5 g | | | | | | 0.4 | | |
| Example 6 g | | | | | | | 0.4 | |
| Example 7 g | | | | | | | | 0.4 |
| g | 40.4 | 40.4 | 40.4 | 40.4 | 40.4 | 40.4 | 40.4 | 40.4 |
| Quality of sediment (Scale 1-5) | | | | | | | | |
| 1 = no separation of lacquer and MM | | | | X | X | | | |
| 2 = fluffy sediment | | X | X | | | | X | X |
| 3 = soft sediment | | | | | | | | |
| 4 = soft sediment/difficult to stir | | | | | | X | | |
| 5 = solid sediment | X | | | | | | | |
| Testing the suspended solids behavior | | | | | | | | |
| 10 days in drying cabinet (+50°) 14 hours centrifuge, Jouan CT 4.22 | X | X | X | X | X | X | X | X |

TABLE 7

| Dispersion: 10 min blade agitator, Ø 45 mm 2000 U/min PE beaker 350 ml | A | B | C | D | E | F | G | H |
|---|---|---|---|---|---|---|---|---|
| DD blue-streak lacquer g | 100 | 100 | 100 | 100 | 100 | 100 | 100 | |
| ACEMATT TS 100 g | 4.4 | | | | | | | |
| Example 1 g | | 4.4 | | | | | | |
| Example 2 g | | | 4.4 | | | | | |
| Example 3 g | | | | 4.4 | | | | |
| Example 4 g | | | | | 4.4 | | | |
| Example 5 g | | | | | | 4.4 | | |
| Example 6 g | | | | | | | 4.4 | |
| Example 7 g | | | | | | | | |
| Discharge time cog - beaker 4 mm s | ca 24 | ca 20 | ca 19 | 14 | 13 | 18 | 11 | |
| Addition of Desmodur L 75 K g | 50 | 50 | 50 | 50 | 50 | 50 | 50 | |
| Discharge time cog - beaker 4 mm s | 16 | 16 | 15 | 13 | 13 | 16 | 12 | |
| Knife application to black discs, slot spreader 150 µm, Coatmaster 509 MC, 25 mm/s, | | | | | | | | |

TABLE 7-continued

| Dispersion: 10 min blade agitator, Ø 45 mm 2000 U/min PE beaker 350 ml | A | B | C | D | E | F | G | H |
|---|---|---|---|---|---|---|---|---|
| drying time: 25-30 min, forced drying 120 min 50° C. | | | | | | | | |
| Temperature during application ° C. | 22 | 22 | 22 | 22 | 22 | 22 | 22 | |
| Rel. humidity during application % | 55 | 55 | 55 | 55 | 55 | 55 | 55 | |
| Thickness of layer, μm | | | | | | | | |
| 60°-Reflectometer value | 16.5 | 21.5 | 28.0 | 25.4 | 30.0 | 25.3 | 83.6 | |
| 85°-Reflectometer value | 41.7 | 50.3 | 56.7 | 55.5 | 62.1 | 57.0 | 91.3 | |
| Δ85°-60° Reflectometer value | 25.2 | 28.8 | 28.7 | 30.1 | 32.1 | 31.7 | 7.7 | |
| Density with yellow filter over black surface | | | | | | | | |

TABLE 8

| Sample no. | Name of sample | Wax detachment | Comments |
|---|---|---|---|
| A | ACEMATT TS 100 | No | Uncoated standard |
| B | Example 1 | No | |
| C | Example 2 | No | |
| D | Example 3 | No | |
| E | Example 4 | No | |
| F | Example 5 | No | |
| G | Example 6 | No | |
| H | Example 7 | No | |

Amount of solvent weighed out: 35 g ethoxypropyl acetate
Amount of matting agent weighed out: 1 g
Manual incorporation
Storage overnight at 50° C. in drying cabinet

The invention claimed is:

1. A structurally coated pyrogenic silica particles consisting essentially of coated silica particles, wherein the coating is organically modified polysiloxanes alone or in combination with wax and wherein the silica particles have a BET surface area of from 80 to 450 m²/g, and a DBP index (%) of from 240 to 380.

2. The structurally coated silica as claimed in claim 1, wherein it has a carbon content of 1 to 30 wt. %.

3. The structurally coated silica as claimed in claim 1 wherein it has a bulk density of from 10 to 60 g/l.

4. A process for preparing a structurally coated silica comprising loading a pyrogenic silica with water and a coating agent in a suitable mixing vessel to form a reaction mixture, milling and subsequently drying the milled silica, wherein the reaction mixture has a pH value from about 7-14.

5. In a lacquer containing matting agents wherein the improvement comprises matting agents composed of the structurally coated silica as claimed in claim 1.

6. The lacquer of claim 5 wherein the lacquer is a polyurethane.

7. A structurally coated pyrogenic silica having a DBP index (%) of from 240 to 380 obtained by the process according to claim 4, wherein the coating agent contains organically modified polysiloxanes alone or in combination with wax.

8. A structurally coated silica particles consisting essentially of coated silica particles, wherein the coating is organically modified polysiloxanes and wherein the coating is prepared from an oil-in-water emulsion of about 20% organically modified polysiloxanes where the organic modification is selected from C2-C8 alcohols and EO/PO polyethers and the polysiloxanes have an approximate average molecular weight 1000-5000 g/mol.

* * * * *

UNITED STATES PATENT AND TRADEMARK OFFICE
CERTIFICATE OF CORRECTION

| | |
|---|---|
| PATENT NO. | : 7,303,624 B2 |
| APPLICATION NO. | : 10/732238 |
| DATED | : December 4, 2007 |
| INVENTOR(S) | : Jürgen Meyer et al. |

Page 1 of 1

It is certified that error appears in the above-identified patent and that said Letters Patent is hereby corrected as shown below:

IN THE SPECIFICATION:

At Column 2, Lines 3-4, replace "200 to 150" with --240 to 380 (%)--.

Signed and Sealed this

Twenty-ninth Day of April, 2008

JON W. DUDAS
*Director of the United States Patent and Trademark Office*